(12) United States Patent
Kawasaki et al.

(10) Patent No.: US 9,261,631 B2
(45) Date of Patent: Feb. 16, 2016

(54) METHOD FOR MANUFACTURING A DIFFRACTION GRATING

(71) Applicant: HITACHI HIGH-TECHNOLOGIES CORPORATION, Tokyo (JP)

(72) Inventors: Kenji Kawasaki, Tokyo (JP); Masahiko Ogino, Tokyo (JP); Akihiro Miyauchi, Tokyo (JP)

(73) Assignee: Hitachi High-Technologies Corporation, Tokyo (JP)

(*) Notice: Subject to any disclaimer, the term of this patent is extended or adjusted under 35 U.S.C. 154(b) by 0 days.

(21) Appl. No.: 14/379,974

(22) PCT Filed: Feb. 1, 2013

(86) PCT No.: PCT/JP2013/052302
§ 371 (c)(1),
(2) Date: Aug. 20, 2014

(87) PCT Pub. No.: WO2013/145850
PCT Pub. Date: Oct. 3, 2013

(65) Prior Publication Data
US 2015/0015957 A1 Jan. 15, 2015

(30) Foreign Application Priority Data
Mar. 30, 2012 (JP) .................... 2012-078806

(51) Int. Cl.
G02B 5/18 (2006.01)
B29C 43/02 (2006.01)
B29C 43/18 (2006.01)
B29D 11/00 (2006.01)
B29L 11/00 (2006.01)

(52) U.S. Cl.
CPC ............. G02B 5/18 (2013.01); B29C 43/021 (2013.01); B29C 43/18 (2013.01);
(Continued)

(58) Field of Classification Search
None
See application file for complete search history.

(56) References Cited

U.S. PATENT DOCUMENTS 3,337,945 A * 8/1967 Mooney .......................... 29/423
5,031,172 A * 7/1991 Umeda et al. .............. 369/275.1
(Continued)

FOREIGN PATENT DOCUMENTS

DE          29 36 854 A1    4/1981
JP          57-024042 A     2/1982
(Continued)

OTHER PUBLICATIONS

Haisma J et al.: "Mold-Assisted Nanolithography: A Process for Reliable Pattern Replication", Journal of Vacuum Science and Technology: Part B, AVS/AIP, Melville, New York, NY, US, vol. 14, No. 6, Nov. 1, 1996, pp. 4124-4128, ISSN: 1071-1023, DOI: 10.1116/1.588604.

*Primary Examiner* — Arnel C Lavarias
(74) *Attorney, Agent, or Firm* — Volpe and Koenig, P.C.

(57) ABSTRACT

A diffraction grating excellent in surface precision and allowing its miniaturization and weight reduction and a method for manufacturing the same. The present invention includes: a glass substrate having a thickness of 0.5 mm to 8 mm; a resin-made microstructure body having an unevenness pattern and formed on one surface of the glass substrate; and a flat resin layer formed on the other surface of the glass substrate. Even if the glass substrate has surface precision of λ/2 or greater, the replica of the diffraction grating, in which the microstructure body is not influenced by the surface precision of the glass substrate and which is excellent in surface precision, can be manufactured by the flatness of the resin layer. In addition, since the glass substrate can be made thin, the miniaturization and weight reduction of the diffraction grating can be achieved.

3 Claims, 2 Drawing Sheets

(52) U.S. Cl.
CPC ....... *B29D 11/00769* (2013.01); *G02B 5/1847* (2013.01); *G02B 5/1852* (2013.01); *B29K 2995/0018* (2013.01); *B29L 2011/00* (2013.01)

(56) References Cited

U.S. PATENT DOCUMENTS

| | | | |
|---|---|---|---|
| 5,225,935 A | | 7/1993 | Watanabe et al. |
| 2006/0061866 A1* | | 3/2006 | Tateno ............... 359/572 |
| 2007/0076297 A1 | | 4/2007 | Shimmo |

FOREIGN PATENT DOCUMENTS

| | | | |
|---|---|---|---|
| JP | 61-209139 | A | 9/1986 |
| JP | 62-238502 | A | 10/1987 |
| JP | 62-238503 | A | 10/1987 |
| JP | 63-018254 | B2 | 4/1988 |
| JP | 05-185441 | A | 7/1993 |
| JP | 08248207 | A * | 9/1996 |
| JP | 09-274425 | A | 10/1997 |
| JP | 10-232306 | A | 9/1998 |
| JP | 2003-315519 | A | 11/2003 |
| JP | 2007-323762 | A | 12/2007 |

* cited by examiner

FIG.1
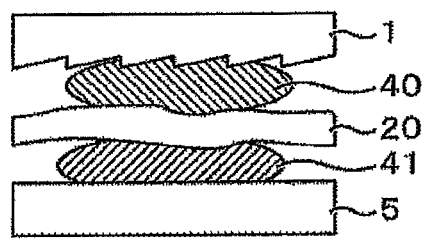
FIG.2A
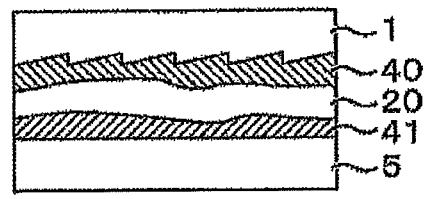
FIG.2B
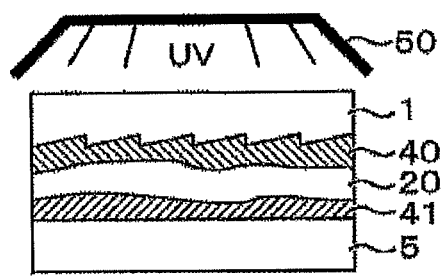
FIG.2C
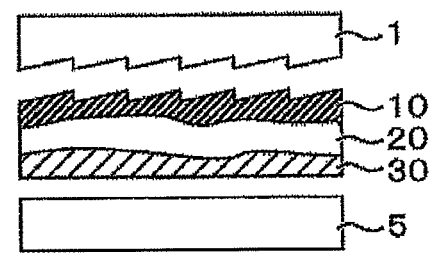
FIG.2D (PRIOR ART)

METHOD FOR MANUFACTURING A DIFFRACTION GRATING

TECHNICAL FIELD

The present invention relates to a diffraction grating and a method for manufacturing the same.

BACKGROUND ART

A spectroscope is a device that analyzes the spectrum of light emitted from a sample. A diffraction grating is one of the key components of the spectroscope. The performance of the spectroscope is determined based on the performance of the diffraction grating. The performance of the diffraction grating is determined based on the interval between grooves matching the wavelength of light to be analyzed, the precision of the interval, the reflectance of the light to be analyzed, and surface precision expressing the size of unevenness spots on the surface of the diffraction grating.

A diffraction grating for use in a spectroscope is manufactured by cutting off a metal piece with a ruling engine and an electron beam irradiation apparatus. It is unfavorable to manufacture the diffraction grating with such apparatuses since the introduction and maintenance costs of the apparatuses are required.

As a diffraction grating for use in a general-purpose spectroscope, a replica manufactured using a diffraction grating, which is manufactured with the method described above, as a master is used. The manufacturing method in which the replica is extracted from the master is suitable as a method for manufacturing the diffraction grating for use in the general-purpose spectroscope since the introduction and maintenance costs of a ruling engine and an electron beam irradiation apparatus can be reduced.

In recent years, nano-imprint technologies have been developed and applied to various products. The nano-imprint technology is a technology for transferring a microstructure having a size of several nanometers to several micrometers from a master to a replica or from the replica to the master. The nano-imprint technology is high in versatility in that it can be applied to various products. In addition, the nano-imprint technology includes a technology that allows cost reduction and mass production with automation. With the application of such a nano-imprint technology, it becomes possible to manufacture the replicas of diffraction gratings at low costs and in large amounts (e.g., Patent Literature 1 or the like).

PRIOR ART REFERENCE

Patent Literature

Patent Literature 1: JP 2007-323762 A

SUMMARY OF THE INVENTION

Problems to be Solved by the Invention

The manufacturing of the replica of a diffraction grating with the nano-imprint technology is performed in such a way that a resin layer is formed on the front surface of a glass substrate, an original plate (master) is pressed onto the resin layer to transfer the reverse pattern of the original plate to the resin layer, and the original plate is separated from the resin layer. Here, the performance of the diffraction grating is greatly influenced by its surface precision. The diffraction grating is generally required to have surface precision of $\lambda/2$ or less based on the wavelength ($\lambda$=632.8 nm) of He—Ne laser light, and the manufacturing of the replica satisfying such surface precision is required. Since the surface precision of the manufactured replica is influenced by the surface precision of the glass substrate, the glass substrate excellent in surface precision is required to manufacture the replica of the diffraction grating. However, it gives rise to the disadvantages that the glass substrate excellent in surface precision is a glass having a certain degree of thickness due to its processing problem and is costly due to its polishing operation.

If a thin glass substrate inferior in surface precision is available as the replica of the diffraction grating, it is preferable from the viewpoint of the miniaturization, weight reduction, and cost reduction of the diffraction grating. In addition, a thin glass substrate that can easily bend is preferably used to facilitate a separating operation in a transfer process. However, when the replica of the diffraction grating is manufactured using such a thin glass substrate inferior in surface precision, the surface precision of the diffraction grating is also reduced. As a result, desired device characteristics cannot be obtained.

The present invention has an object of providing a diffraction grating excellent in surface precision and allowing its miniaturization and weight reduction and a method for manufacturing the same.

Means for Solving the Problem

The present invention is characterized by a method for manufacturing a diffraction grating in which a microstructure body having an unevenness pattern is formed on a front surface of a glass substrate, the method comprising: a step of arranging the glass substrate, which has a thickness of 0.5 mm to 8 mm and has light curing resins coated on both surfaces thereof, on a flat plate having surface precision of $\lambda/2$ or less; a step of holding and pressing the glass substrate having the light curing resins coated on the both surfaces thereof between the flat plate and an original plate having the unevenness pattern to fill the light curing resin opposing the original plate in the unevenness pattern of the original plate; a step of curing the light curing resins; and a step of separating the original plate and the flat plate from the light curing resins on the glass substrate to form the microstructure body having the unevenness pattern on one surface of the glass substrate and form a flat resin layer on the other surface thereof.

In addition, the present invention is characterized by a method for manufacturing a diffraction grating in which a microstructure body having an unevenness pattern is formed on a front surface of a glass substrate, the method comprising: a step of holding and pressing the glass substrate, which has a thickness of 0.5 mm to 8 mm and has first light curing resins coated on both surfaces thereof, between a pair of flat plates having surface precision of $\lambda/2$ or less and curing the first light curing resins to form resin layers on the both surfaces of the glass substrate; a step of coating a front surface of one of the resin layers of the glass substrate with a second light curing resin and pressing an original plate having the unevenness pattern onto the second light curing resin to fill the second light curing resin in the unevenness pattern of the original plate; a step of curing the second light curing resin; and a step of separating the original plate from the second light curing resin to form the microstructure body having the unevenness pattern on one of the surfaces of the glass substrate.

Moreover, the present invention is characterized by a diffraction grating, comprising: a glass substrate having a thickness of 0.5 mm to 8 mm; a resin-made microstructure body having an unevenness pattern and formed on one surface of the glass substrate; and a flat resin layer formed on the other surface of the glass substrate.

Note that in this specification, surface precision refers to surface precision calculated based on the wavelength ($\lambda$=632.8 nm) of He—Ne laser light.

Effect of the Invention

The present invention provides a diffraction grating excellent in surface precision and allowing its miniaturization and weight reduction and a method for manufacturing the same.

BRIEF DESCRIPTION OF THE DRAWINGS

FIG. 1 is an explanatory view showing the replica of a diffraction grating according to a first embodiment;

FIGS. 2A to 2D are explanatory views showing the manufacturing processes of the first embodiment;

EMBODIMENT FOR CARRYING OUT THE INVENTION

Figure 4:
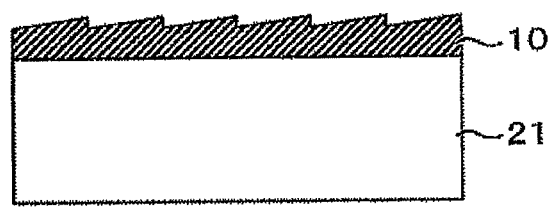
FIG. 4 is an explanatory view showing the configuration of a conventional replica.

First, the replica of a conventional diffraction grating will be described. FIG. 4 shows a conceptual view of the cross section of the replica of a conventional diffraction grating. As shown in FIG. 4, the replica of the conventional diffraction grating has a resin-made microstructure body 10 on the front surface of a grass substrate 21. The microstructure body 10 has a shape in which the height between the bottom part and the top part of an unevenness surface is at around 0.1 μm and unevenness parts are arranged periodically or randomly at an interval of 0.1 μm to 10 μm. The shape and size of the unevenness pattern of the microstructure body 10 are appropriately set according to the required performance or the like of the diffraction grating. As the glass substrate 21, one satisfying surface precision of $\lambda/2$ or less based on the wavelength ($\lambda$=632.8 nm) of He—Ne laser light is used. The glass substrate 21 has a thickness of 10 mm or greater.

According to the conventional configuration, it has been difficult to set the surface precision of a diffraction grating at $\lambda/2$ or less when a glass substrate having a thickness of 10 mm or less is used. This is because the glass substrate having a thickness of 10 mm or less has surface precision of $\lambda/2$ or greater. The microstructure body 10 formed on the glass substrate is greatly influenced by the surface precision of the glass substrate 21. Therefore, if the glass substrate 21 has surface precision of $\lambda/2$ or greater, the diffraction grating also has surface precision of $\lambda/2$ or greater.

On the other hand, it has been found that a diffraction grating having surface precision of $\lambda/2$ or less can be achieved even if a glass substrate having a thickness of 10 mm or less and surface precision of $\lambda/2$ or greater is used provided that a flat resin layer is formed, in manufacturing the replica of the diffraction grating, on the surface (rear surface) of the glass substrate on the side opposite to the surface thereof on which the microstructure body is formed, whereby the present invention has been accomplished.

Note that according to the present invention, surface precision is measured based on the wavelength ($\lambda$=632.8 nm) of He—Ne laser light and calculated in such a way as to estimate a Newton ring observed by superimposing a measurement surface on an optical flat plate and irradiating the surface with the He—Ne laser light.

Hereinafter, embodiments of the diffraction grating of the present invention will be described.

First Embodiment

FIG. 1 shows the cross-sectional view of the replica of the diffraction grating according to an embodiment of the present invention. As shown in FIG. 1, the diffraction grating of this embodiment has a glass substrate 20 having a thickness of 0.5 mm to 8 mm, a resin-made microstructure body 10 having an unevenness pattern and formed on one surface of the glass substrate, and a flat resin layer 30 formed on the other surface of the glass substrate. Here, the flat resin layer 30 is formed on the other surface of the glass substrate. Therefore, even if the glass substrate 20 has surface precision of $\lambda/2$ or greater, the diffraction grating in which the microstructure body 10 is not influenced by the surface precision of the glass substrate 20 and which is excellent in surface precision can be achieved by the flatness of the resin layer 30. Thus, since one having surface precision of $\lambda/2$ or greater is allowed as the glass substrate to be used, the glass substrate having a thickness of 8 mm or less and thinner than a conventional glass substrate can be used. In addition, the thickness of the glass substrate is preferably made thinner from the viewpoint of miniaturization and weight reduction and is preferably 3 mm or less from the viewpoint of imparting flexibility. On the other hand, since the microstructure body 10 cannot keep its surface shape by itself, the glass substrate plays a role in supporting the glass substrate. For this reason, the glass substrate is required to have rigidity of such a degree that it does not bend due to a self weight and preferably has a thickness of 0.5 mm or greater. Accordingly, the thickness of the glass substrate 20 is preferably in the range of 0.5 mm to 8 mm and more preferably in the range of 1 mm to 3 mm. In addition, the surface precision of the glass substrate 20 can be at $\lambda/2$ or greater, and a general-purpose glass plate called a float glass, a glass plate subjected to polishing, or the like can be used as such. In addition, a glass plate having the front surface thereof subjected to satin finish can be used to enhance adhesion with the resin microstructure body 10 and the resin layer 30. The microstructure body 10 may have a thickness enough to form a prescribed unevenness pattern therein, e.g., a thickness of about 100 nm to 300 μm. In addition, the resin layer 30 may have a thickness enough to secure its flatness, e.g., a thickness of about 100 nm to 300 μm. As the diffraction grating, one formed in a square or rectangle shape and having a side of about 20 mm to 140 mm is generally used.

Next, a method for manufacturing the diffraction grating shown in FIG. 1 will be described using FIGS. 2A to 2D. FIGS. 2A to 2D show an example of manufacturing the replica of the diffraction grating with a nano-imprint technology. Here, an example of forming the microstructure body 10 with an optical nano-imprint method will be described. First, as shown in FIG. 2A, a light curing resin 40 to form the microstructure body 10 is coated onto one surface of the glass substrate 20, and a light curing resin 41 to form the flat resin layer 30 is coated onto the other surface thereof. Next, as shown in FIG. 2B, the light curing resin 40, the glass substrate 20, and the light curing resin 41 are held and pressed between an original plate 1 having an unevenness pattern and an optical flat plate 5. In this process, the light curing resins flow through the gap between the glass substrate 20 and the original plate 1 and the gap between the glass substrate 20 and the optical flat plate 5, whereby the light curing resin 40 fills in the unevenness pattern of the original plate 1 and the light curing resin 41 forms a flat layer along the surface of the optical flat plate. As shown in FIG. 2C, by simultaneously irradiating the light curing resins 40 and 41, which have not been cured, with the UV light of a UV lamp 50 in this state, the light curing resins 40 and 41 are cured. After that, as shown in FIG. 2D, the original plate 1 and the optical flat plate 5 are, respectively, separated from the cured light curing resins, whereby the diffraction grating having the microstructure body 10 on one surface of the glass substrate 20 and the flat resin layer 30 on the other thereof can be manufactured.

In manufacturing the replica shown in FIGS. 2A to 2D, the optical flat plate 5 has so excellent surface precision (e.g., $\lambda/10$ or less). Therefore, the light curing resin 41 (resin layer 30) pressed by the optical flat plate 5 and cured has excellent surface precision corresponding to the optical flat plate 5. As a result, the surface precision of the microstructure body 10 formed on the glass substrate 20 is also enhanced, and the diffraction grating having surface precision of $\lambda/2$ or less can be achieved. That is, the resin layer is interposed between the optical flat plate and the glass substrate 20, whereby the surface precision of the microstructure body 10 can be reproduced like the optical flat plate and the diffraction grating having excellent surface precision can be achieved. Besides the advantage that the surface precision of the glass substrate 20 becomes nonrestrictive, this offers the advantage that it becomes possible to make the value of the surface precision of the manufactured diffraction grating the same as that of the surface precision of the optical flat plate. That is, it becomes also possible to set the surface precision of the diffraction grating at $\lambda/10$ or less. Thus, the diffraction grating having high resolution can be provided. According to the conventional configuration shown in FIG. 1, an appropriate glass substrate is required to achieve surface precision of $\lambda/10$ or less, which results in an extreme increase in the cost of the replica. On the other hand, according to this embodiment, the optical flat plate is not a member directly used in the replica, which gives less influence on the cost of the replica and can provide the diffraction grating having excellent surface precision at low cost. Note that although an example of using the optical flat as a pressing plate is described here, it is also possible to use any plate other than the optical flat so long as it has surface precision of $\lambda/2$ or less.

The advantage of the processes shown in FIGS. 2A to 2D is that curing treatment by UV irradiation can be simultaneously applied to the light curing resins 40 and 41 that have not been cured. Generally, a light curing resin has a tendency to shrink its volume before and after its curing called curing shrinkage. If the curing treatment shown in FIG. 2C is applied to the light curing resins 40 and 41 at different times, the light curing resin to which the curing treatment is first applied is susceptible to the curing shrinkage of the light curing resin to which the curing treatment is next applied. By simultaneously performing the curing treatment, stresses applied onto the front and rear surfaces of the glass substrate 20 can be made even and cancelled. As a result, the glass substrate 20 can be prevented from warping.

In the separation process shown in FIG. 2D, if the glass substrate 20 to be used is thin, a separation starting point is generated between the original plate 1 and the light curing resin when the glass substrate 20 is curved, whereby a force required to separate the original plate 1 from the light curing resin can be reduced. As the separation procedure of FIG. 2D, the original plate 1 and the optical flat plate 5 are simultaneously separated. However, if necessary, the original plate 1 and the optical flat plate 5 may be separated at different times. Before the process shown in FIG. 2A, a solution made of a fluorine-based material called a release agent is desirably coated on the original plate 1 and the optical flat plate 5 in advance.

Although the manufacturing example shown in FIGS. 2A to 2D describes an example of performing the optical nano-imprint method using the light curing resins, the microstructure body 10 and the resin layer 30 may be formed with a thermal nano-imprint method. In this case, films made of a thermoplastic resin are arranged on both surfaces of the glass substrate and softened by heating. Then, the films are pressed by the original plate and the optical flat plate so as to be deformed along the original plate and the optical flat plate. After that, the films are cooled, and the original plate and the optical flat plate are separated from the films. In this way, the replica of the diffraction grating can be manufactured. Note, however, that the thermal nano-imprint method is likely to cause residual stresses resulting from thermal stresses in the respective members in the heating and cooling processes. From the viewpoint of this, the microstructure body 10 and the resin layer 30 are preferably formed with the optical nano-imprint method.

In the diffraction grating of this embodiment, the resin-made layers are arranged on both surfaces of the glass substrate 20, whereby a warp can be further reduced than the case shown in FIG. 1 in which the resin layer (microstructure body 10) is formed on only one surface. In a case in which the microstructure body 10 is formed with the optical nano-imprint, a warp is likely to be caused due to stresses partially caused by the curing shrinkage of the light curing resins as described above. In order to address this, the arrangement of the resin layers on both surfaces makes the stresses symmetric on the upper and lower surfaces of the glass substrate. As a result, a warp can be reduced. Further, in a case in which the microstructure body 10 is formed with the thermal nano-imprint, a warp is likely to be caused due to stresses caused by a difference in the coefficient of thermal expansion between the resins and the glass substrate in the heating and cooling processes. In this case as well, the arrangement of the resin layers on both surfaces makes the stresses due to a difference in the coefficient of thermal expansion symmetric on the upper and lower surfaces of the glass substrate. As a result, a warp can be reduced. Therefore, from the viewpoint of reducing a warp, the curing shrinkage amounts or the coefficients of thermal expansion of the resins constituting the microstructure body 10 and the resin layer 30 are preferably the same. In addition, on this occasion, if the thicknesses of the resins on both surfaces of the glass substrate 20 are made the same, the effect of reducing a warp can be enhanced.

As the replica of the diffraction grating, the structure in which the resin-made microstructure body 10 is formed on the front surface of the glass substrate 20 is described. However, in the application of the diffraction grating, a metal film made of aluminum, silver, gold, or the like is formed on the front surface of the microstructure body 10 by deposition or the like. The thickness of the formed film is desirably in the range of 100 nm to 500 nm, i.e., a thickness of such a degree that light to be measured is entirely reflected and the shape of the microstructure body is not lost.

Second Embodiment

Figure 3:
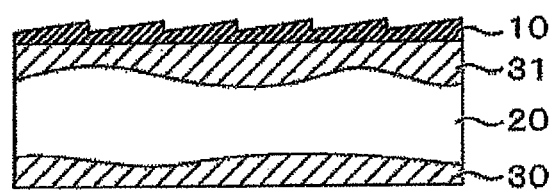
FIG. 3 is an explanatory view showing the configuration of the replica of the diffraction grating according to a second embodiment.

A modified example of the replica of the diffraction grating according to the embodiment of the present invention will be described. FIG. 3 shows a cross-sectional view of the replica of the diffraction grating of this embodiment. This embodiment is different from the first embodiment in that a resin layer formed on the side of the glass substrate 20 on which an unevenness pattern is to be formed has the two-layer structure of the microstructure body 10 and a resin layer 31. The feature of this embodiment is that the flat resin layers 30 and 31 having surface precision of $\lambda/2$ or less are formed on both surfaces of the glass substrate 20 having surface precision of $\lambda/2$ or greater, and the microstructure body 10 is formed on the front surface. Even with such a configuration, the replica of the diffraction grating having excellent surface precision can be manufactured regardless of the surface precision of the glass substrate 20.

The replica of the diffraction grating of this embodiment can be manufactured by making use of the processes shown in FIGS. 2A to 2D. First, the process of forming the resin layers 30 and 31 on both surfaces of the glass substrate 20 will be described. This process is performed using an optical flat plate instead of the original plate 1 in the processes shown in FIGS. 2A to 2D. That is, the glass substrate 20 having the light curing resins coated on both surfaces thereof is held and pressed between the pair of optical flat plates, the light curing resins on both surfaces are cured by UV light, and the pair of optical flat plates is separated from the resin layers. In this way, a laminated structure in which the flat resin layers 30 and 31 are formed on both surfaces of the glass substrate 20 is obtained. Then, the laminated structure having the light curing resin coated on the front surface of the resin layer 31 is arranged on the optical flat plate, the original plate 1 is pressed onto the front surface of the light curing resin to fill the light curing resin in the unevenness pattern of the original plate 1. After that, the light curing resin is cured by UV light, and the original plate 1 is separated from the light curing resin. As a result, the replica of the diffraction grating shown in FIG. 3 can be manufactured.

A metal layer is formed on the front surface of the microstructure body 10 of the replica manufactured in the same way as the first embodiment, and thus the replica is used as the diffraction grating.

According to the first and second embodiments described above, it becomes possible to set surface precision at a required value or less even if a thin glass substrate is used to manufacture the replica of a diffraction grating required to have surface precision of at least $\lambda/2$ or less. Thus, a thin glass substrate that has been hardly used in the past is made available, and the weight reduction of a diffraction grating can be achieved. Moreover, since the polishing of a glass substrate that has been required in the past can be simplified, the cost of a diffraction grating can be reduced. In addition, by the application of a thin glass substrate, a separation process to manufacture a replica can be facilitated.

EXPLANATION OF REFERENCES

1: original plate
5: optical flat plate
10: microstructure body
21, 21: glass substrate
30, 31: resin layer
40, 41: light curing resin
50: UV lamp

The invention claimed is:

1. A method for manufacturing a diffraction grating in which a microstructure body having an unevenness pattern is formed on a front surface of a glass substrate, the method comprising:
 a step of holding and pressing the glass substrate, which has a thickness of 0.5 mm to 8 mm and has first light curing resins coated on both surfaces thereof, between a pair of flat plates having surface precision of $\lambda/2$ or less and curing the first light curing resins to form resin layers on the both surfaces of the glass substrate;
 a step of coating a front surface of one of the resin layers of the glass substrate with a second light curing resin and pressing an original plate having the unevenness pattern onto the second light curing resin to fill the second light curing resin in the unevenness pattern of the original plate;
 a step of curing the second light curing resin; and
 a step of separating the original plate from the second light curing resin to form the microstructure body having the unevenness pattern on one of the surfaces of the glass substrate.

2. The method for manufacturing the diffraction grating of claim 1, wherein
 the glass substrate has surface precision of $\lambda/2$ or greater.

3. The method for manufacturing the diffraction grating of claim 2, comprising:
 a step of forming a metal layer on a front surface of the microstructure body.

* * * * *